ated Patent [19]

United States Patent [19]

Cremer et al.

[11] 4,200,333
[45] Apr. 29, 1980

[54] ADJUSTABLE HINGE MOUNT FOR A SEATBACK

[75] Inventors: Heinz P. Cremer; Paul Werner, both of Remscheid, Fed. Rep. of Germany

[73] Assignee: Keiper Automobiltechnik GmbH & Co. KG, Remscheid, Fed. Rep. of Germany

[21] Appl. No.: 923,649

[22] Filed: Jul. 11, 1978

[30] Foreign Application Priority Data

Jul. 25, 1977 [DE] Fed. Rep. of Germany ....... 2733488

[51] Int. Cl.² ............................................. A47C 1/025
[52] U.S. Cl. ..................................... 297/362; 16/143; 74/804
[58] Field of Search ............... 297/362, 361, 354, 355, 297/373, 374, 366, 367; 16/139, 143, 144; 74/640, 804, 413

[56] References Cited

U.S. PATENT DOCUMENTS

| 3,161,081 | 12/1964 | Musser | 74/640 |
| 3,214,999 | 11/1965 | Lapp | 74/640 X |
| 3,972,563 | 8/1976 | Gustafsson | 297/355 X |

FOREIGN PATENT DOCUMENTS

| 2125705 | 4/1972 | Fed. Rep. of Germany | 297/355 |
| 2615789 | 10/1976 | Fed. Rep. of Germany | 297/362 |
| 1170708 | 11/1969 | United Kingdom | 16/143 |

*Primary Examiner*—William E. Lyddane
*Attorney, Agent, or Firm*—Michael J. Striker

[57] ABSTRACT

A mechanism for adjusting the inclination of a backrest of a vehicle seat includes two hinges each at one side of the seat and each including two hinge members respectively secured to the seat component and the backrest component of the seat and mounted on each other for tilting. Each of the hinge members has an internal gear annulus, the gear annuli of the two hinge members having the same diameter but different numbers of teeth. A support element is mounted for rotation in the space bounded by the gear annuli and has a cross-sectionally elliptical peripheral surface. An elastic band embedding a plurality of uniformly distributed pins is supported on the peripheral surface of the support member and meshes with both of the gear annuli at the region surrounding the major axes of the elliptical generatrices of the peripheral surface of the support member.

The number of pins which engage via the band both internal gear annuli corresponds to the number of teeth of the annulus which has the smaller number of teeth.

17 Claims, 6 Drawing Figures

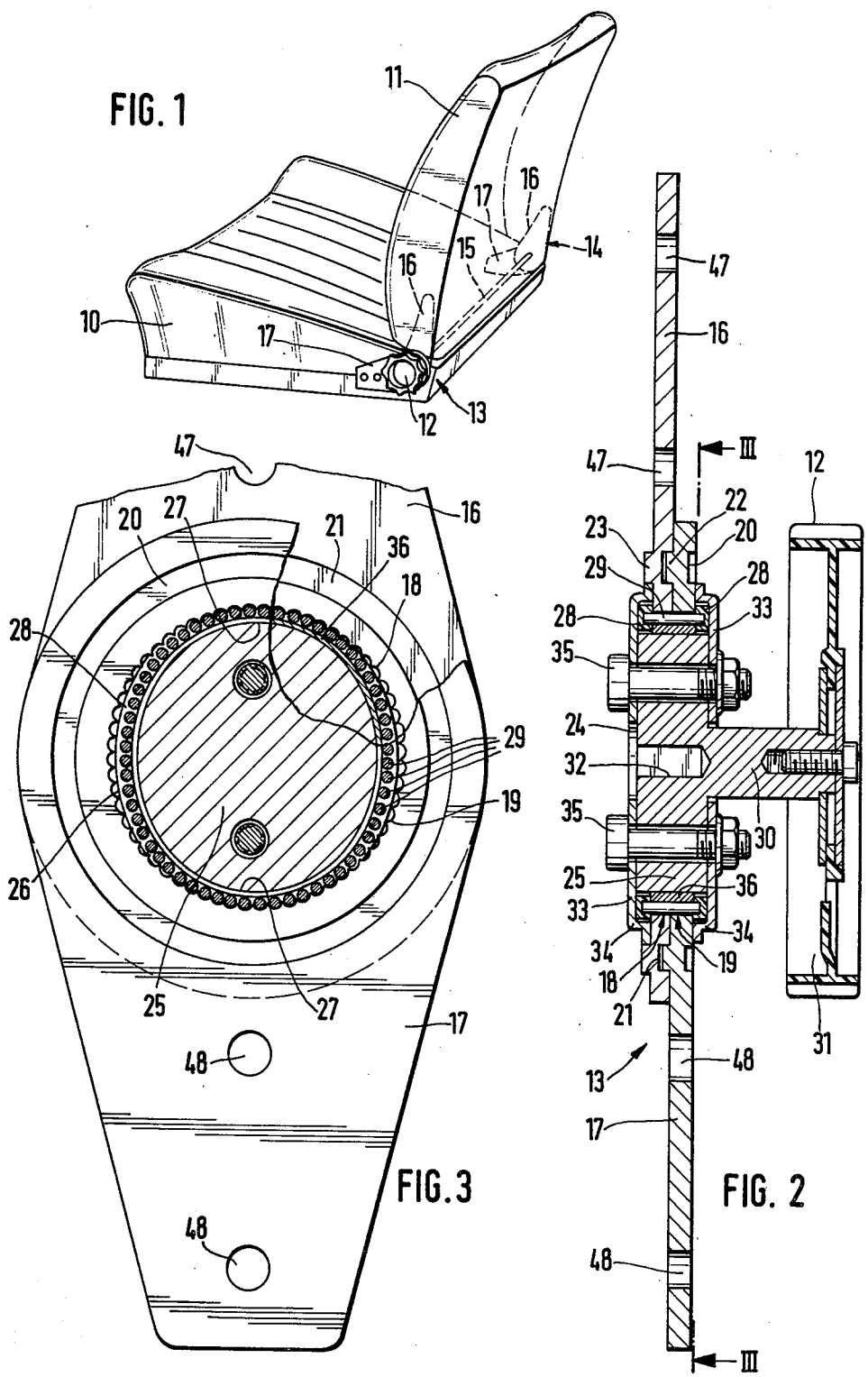

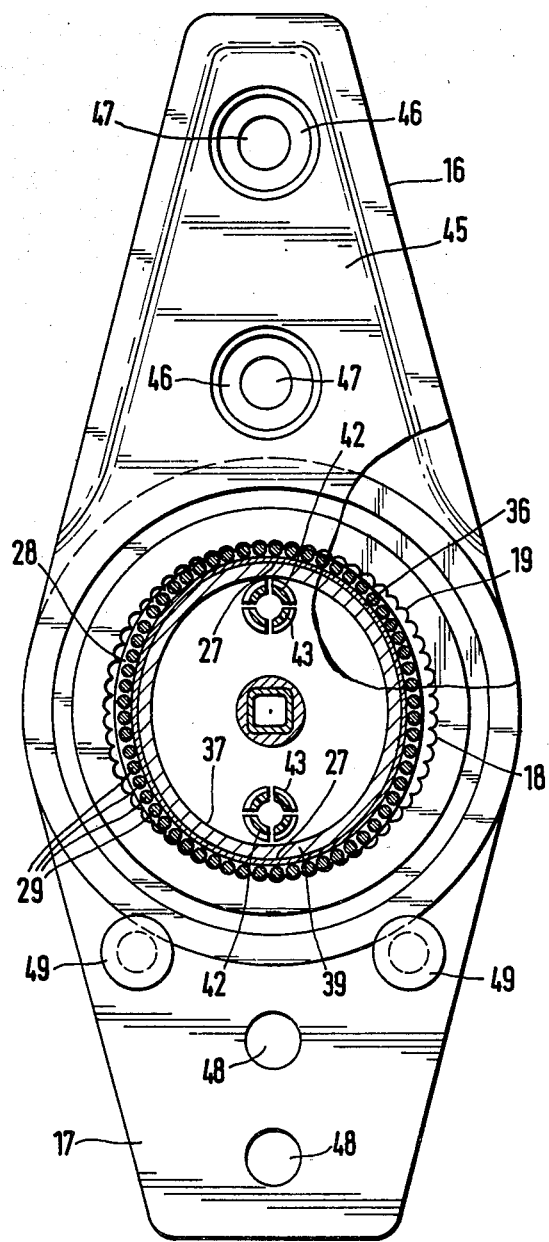
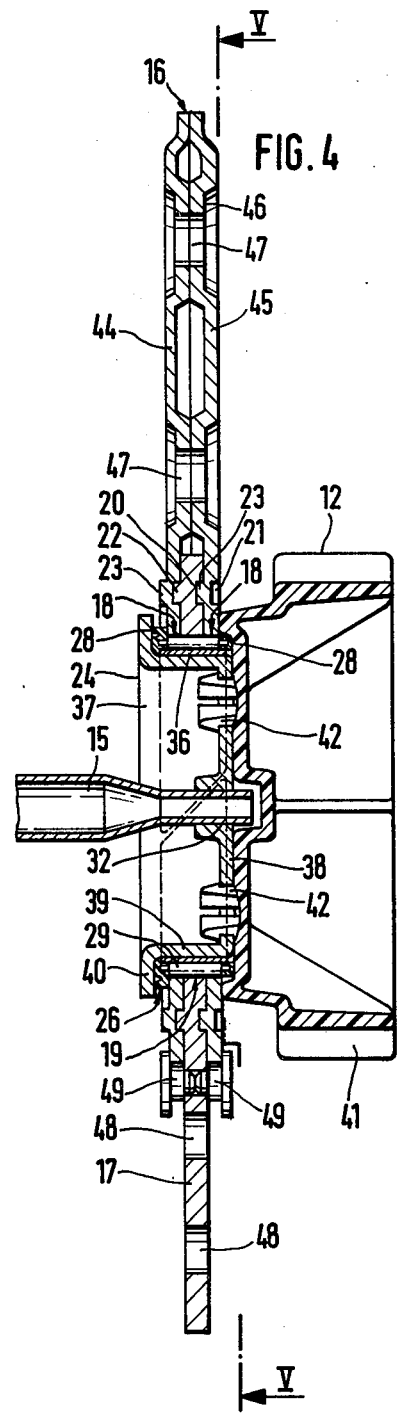

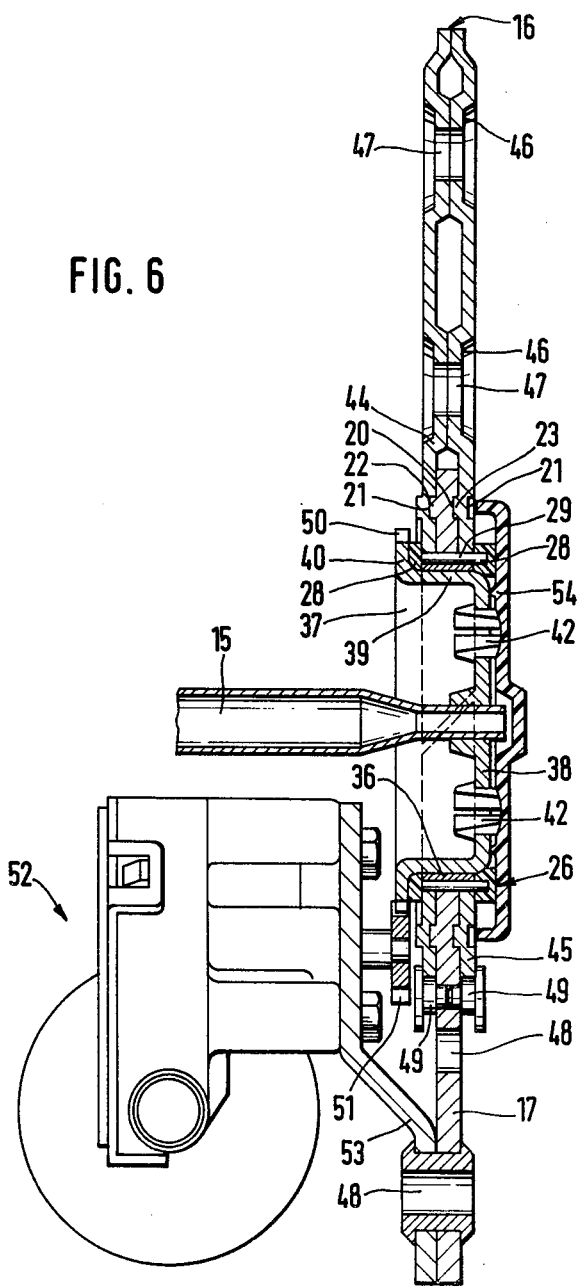

ADJUSTABLE HINGE MOUNT FOR A SEATBACK

BACKGROUND OF THE INVENTION

The present invention relates to an arrangement for adjusting the inclination of the backrest component relative to a seat component of a seat in general, and more particularly to an arrangement of this type which is especially suited for use in vehicle seats.

Various constructions of hinges which tiltably mount the backrest component on the seat component of a vehicle seat are already known and in widespread use. Among these, there are such in which the hinge members of the hinge which are stationarily connected to the components of the seat are mounted on one another for relative tilting about a pivot axis, and each of them is provided with an internal annulus of teeth each of which has a different number of teeth but both of which may have the same diameter. Then, it is also known to provide an adjusting member which causes the hinge members to conduct relative tilting adjustment movement and which meshes with the teeth of the internal gear annuli of the hinge members.

One arrangement of this type has been disclosed in the German Patent DT-PS 1,291,570, in which an internal gear annulus is associated with each of the hinge members, the two gear annuli having different numbers of teeth and also different diameters. Then, an external spur gear meshes with the internal gear annuli, the diameters of the spur gears being different, but the numbers of teeth being the same. These spur gears are arranged on an eccentric section of an adjusting shaft. When the adjusting shaft rotates, the region of meshing engagement of the teeth of the internal gear annuli and of the external spur gears revolves or orbits in correspondence to the position of the eccentric section. Owing to the differences between the numbers of teeth of the two internal gear annuli, there is obtained a relative movement between the hinge members which is usable for the adjustment of the inclination of the backrest component of the seat.

Another arrangement of this type is known from the German Patent DT-Gmb 6,604,918, wherein again an internal gear annulus is associated with each of the hinge members. The internal gear annuli have different numbers of teeth, but the teeth of the internal gear annuli are located along a diameter which is the same for both of the internal gear annuli. Then, a tilting axle which is provided with a handle is connected for joint rotation with an arm on which a support axle is mounted in parallelism with the axis of the tilting shaft and at a distance therefrom. A satellite gear which meshes with the internal gear annuli is rotatably supported on the support axle. When the handle is rotated, the satellite gear rolls in mesh with the internal gear annuli of the hinge members, as a result of which there comes into existence a relative movement between the hinge members. These relative movements can be utilized for the adjustment of the position or inclination of a backrest component of a seat.

These conventional arrangements, as advantageous as they may be in some respects, are also possessed of some disadvantages. One of these disadvantages resides in the fact that the gears which function as adjusting members mesh with the internal gear annuli only at one zone of their circumference so that the gear teeth have to have relatively huge dimensions to be capable of sustaining the high forces acting thereon, especially when the vehicle equipped with the seat having one of these inclination-adjusting arrangements is involved in a collision. In addition thereto, due to the play between the flanks of the teeth and the region of the bearings due to manufacturing tolerances, wear or the like, there comes into existence a relatively large radial play which can result, during the operation of the vehicle, in rattling of the unused seat.

SUMMARY OF THE INVENTION

Accordingly, it is a general object of the present invention to avoid the disadvantages of the prior art.

More particularly, it is an object of the present invention to provide an arrangement for adjusting the inclination of the backrest component of a vehicle seat, which is not possessed of the disadvantages of the conventional arrangements of this type.

Yet another object of the present invention is to so construct the arrangement as to be able to eliminate or compensate for the consequences of manufacturing tolerances on the operation of the arrangement.

Still another object of the present invention is to so design the arrangement of the type here under consideration as to render it possible for the elements of the arrangement which engage one another for adjusting the inclination of the backrest component to mesh with one another at more than one meshing zone.

A concomitant object of the present invention is to present an adjusting arrangement which, while satisfying the above objects, is also possessed of a high transmission ratio and of a self-locking feature which prevents unintentional reclining of the backrest component.

It is also an object of the present invention to provide an arrangement of the above-mentioned type which is simple in construction, inexpensive to manufacture, and reliable and durable in use nevertheless.

In pursuance of these objects and others which will become apparent hereafter, one feature of the present invention resides, briefly stated, in an arrangement for adjusting the inclination of the backrest component relative to a seat component of a seat, particularly a vehicle seat, which comprises, in combination, at least one hinge including two hinge members mounted on each other for tilting about an axis and each being stationarily connected to one of the components of the seat and having an internal gear annulus of a diameter at least substantially equal to and a number of teeth different from those of the other gear annulus; and means for relatively tilting the hinge members, including a support element mounted at the hinge for rotation about the above-mentioned axis and having at least one support surface which extends over only a portion of the periphery of the support element and which is juxtaposed and forms a gap with the internal gear annuli, and an elastic band which contacts the support element at least at the support surface, and that region of which that is situated in the gap meshingly engages the gear annuli. Advantageously, the support surface has a cross-sectional configuration substantially corresponding to the region about the major axis of an ellipse. It is also advantageous and currently preferred when the support element has another support surface identical to the above-mentioned support surface and located diametrically opposite thereto. Under these circumstances, the numbers of the teeth of the internal gear annuli will differ by at least a single multiple of two from one another. Moreover, it is also advantageous when the support element further has two connecting surfaces which extend between the support surfaces and complete the cross-sectional configuration of the periphery of the support element to an ellipse. Under these circumstances, the elastic band also contacts the connection surfaces.

When the support element is constructed in the last-mentioned manner, the elastic band is in meshing engagement with the internal gear annuli of the hinge members at two opposite locations of the latter and at the regions of the main axes of the elliptical generatrices of the periphery of the support element. As a result of the thus obtained high degree of overlap, it is possible to transmit a high torque at relatively small dimensions of the meshing teeth. Also, the freedom from play is also considerably improved by constructing the arrangement in the above-mentioned manner so that any rattling of the hinge members is substantially eliminated. In addition thereto, no rolling and/or sliding motion between the meshing teeth encountered in the prior-art arrangements of this type, takes place at the meshing region; rather, the elastic band maintains its position relative to the internal gear annulus which has the same number of teeth so that wear is substantially reduced.

A simple and inexpensive manufacture of the elastic band which meshes with the internal gear annuli of the hinge members can be achieved, in accordance with a further feature of the present invention, in that the elastic band is constituted by two rings which partially laterally overlap the hinge members, and a plurality of uniformly distributed pins which interconnect the rings and are received in the spaces between the teeth of the internal gear annuli when located in the above-mentioned gap. Advantageously, the number of the pins is identical to the number of the teeth of that one of the internal gear annuli which has the smaller number of teeth.

In order to be able to keep the wear occurring at the periphery of the support member which is constructed as an elliptical disc as low as possible by correspondingly selecting the materials or the surfaces which slide on one another, the arresting band further incorporates a sliding strip which immediately contacts the support surface and which supports the pins. When this expedient is resorted to, it is possible to select the material of the sliding strip based on its wear resistance and/or on the wear resistance of the material of the periphery of the support member, rather than on the properties which are required for the meshing interaction with the teeth of the internal gear annuli. On the other hand, the pins may be of a material different from that of the sliding strip and properly taking into consideration only the conditions existing when the pins mesh with the internal gear annuli, disregarding any requirements which the material of the pins would have to satisfy if the pins were to directly contact the periphery of the support member. Of course, the sliding band will have to be flexible or yieldable in order for the sliding strip to be able to accommodate itself to the elliptical configuration of the periphery of the support member during the relative sliding between the elastic band and the support member.

The arrangement of the present invention further includes means for rotating the support member about the above-mentioned axis, the rotating means including a handgrip member, particularly a handwheel, which is mounted for joint rotation on a stub shaft which coaxially extends from the support member. When the handwheel is rotated, so is the support member so that the regions of the periphery of the support member which surround the main axes of the elliptical generatrices of the periphery of the support member orbit the above-mentioned axis and the support surfaces continuously press the pins of the elastic band into the internal gear annuli of the hinge members at different locations.

A simplified non-cutting manufacture of the support member which is configurated as a cross-sectionally elliptical disc can be obtained when the support member has a cup-shaped configuration and includes a bottom and a peripheral jacket having the support surface. Then, it is advantageous when the width of the jacket corresponds to that of the elastic band. To couple the handwheel with the cup-shaped disc having an elliptical peripheral surface, the bottom of the support member has at least two openings, and the handwheel has at least two arresting members which engage in the openings. Advantageously, the openings of the support member, on the one hand, and the arresting members of the handwheel, on the other hand, are respectively diametrically opposite one another.

In order to be able to uniformly introduce the inclination-adjustment movement into the backrest component of the seat at both lateral regions of the seat, a hinge of the above-mentioned kind is arranged between the backrest component and the seat component of the seat at each of the lateral regions of the vehicle seat. Under these circumstances, only one of the hinges, for instance, the left-hand hinge as seen in the driving direction of the vehicle, is equipped with a handwheel while the right-hand hinge, for instance, is connected with the left-hand hinge by means of a torque-transmitting shaft. For this purpose, the cross-sectionally elliptical support member of each of the hinges has a non-circular opening in its center, and compatibly configurated end portions of the torque-transmitting shaft are received in these non-circular openings in a motion or torque transmitting manner.

Advantageously, the cup-shaped support member further includes a collar on its jacket remote from its bottom, the collar having a circular periphery and an external gear annulus thereon, which is adapted to mesh with a pinion of a motor drive.

In order to keep the internal gear annuli, on the one hand, and the cross-sectionally elliptical support member, on the other hand, free of support forces and to let only the adjusting forces be effective thereat, the hinge members are provided, especially embossed, with circular projections and circular grooves at least one of which receives one of the circular projections of the respective other hinge member.

A safe support of the hinge members which avoids bending forces can be achieved, in accordance with a further concept of the present invention, in that one of the hinge members consists, in the region of the support member, of two brackets which embrace the other of the hinge members from respective axial sides.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view, at a reduced scale, of a motor vehicle seat the backrest component of which is connected with the seat component of the seat by the hinge arrangement of the present invention;

FIG. 2 is a cross sectional view of the hinge arrangement of the present invention the support member of which is constructed as a solid disc;

FIG. 3 is a sectional view taken on line III—III of FIG. 2;

FIG. 4 is a view similar to FIG. 2 but with the support member having a cup-shaped configuration and the upper hinge member consisting of two brackets which embrace the lower hinge member;

FIG. 5 is a view similar to FIG. 3 but taken on line V—V of FIG. 4; and

FIG. 6 is a view similar to FIG. 4 but wherein the jacket of the cup-shaped support member has a collar thereon which is provided with an annulus of external teeth.

DETAILED DISCUSSION OF THE PREFERRED EMBODIMENTS

Referring now to the drawing in detail, and first to FIG. 1 thereof, it may be seen that a seat, particularly a vehicle seat, includes a seat component 10 and a backrest component 11. The backrest component 11 is mounted on the seat component 10 by means of a hinge 13 located at the left-hand side of the seat as considered in the forward driving direction of the vehicle, and a hinge 14 which is located at the right-hand side of the seat. The two hinges 13 and 14 are coupled with one another by a torque-transmitting shaft 15.

As also seen in FIG. 1, but in more detail in FIGS. 2 and 3, each of the hinges 13 and 14 includes an upper hinge member 16 which is stationarily connected to the backrest component 11, and a lower hinge member 17 which is stationarily connected to the seat component 10. In this connection, it is to be mentioned that the hinge members 16 and 17 need not be stationary with respect to their respective associated components 11, 10 at all times and for all purposes. So, for instance, the hinge member 17 could be mounted on the seat component 10 for pivoting so as to render it possible to frontwardly collapse the backrest component 11, together with the hinges 13 and 14, for instance, when the seat is a front seat of a two-door passenger car and access is to be gained to the rear seats of the car. However, during the normal operation of the hinges 13 and 14, that is, even during the adjustment of the inclination of the backrest component 11, the hinge members 16 and 17 will indeed be immovable relative to the associated components 11 and 10 of the seat.

As seen in FIGS. 2 and 3, the hinge members 16 and 17 are provided, at their connecting lugs, each with a circular bore of the same diameter, the marginal portions of the hinge members 16 and 17 which bound these bores being provided with respective internal gear annuli 18 or 19. While the internal gear annulus 18 of the one hinge member 16 has a number of teeth amounting to, for instance, 62, the internal gear annulus 19 of the other hinge member 17 includes, for instance, 60 teeth. While the number of teeth of the internal gear annuli 18 and 19 differ by two, the diameters of the meshing circles of the two internal gear annuli 18 and 19 have the same magnitude.

In order to obtain a coaxial tilting movement of the one hinge member 16 with respect to the other hinge member 17, the internal gear annuli 18 or 19 of each respective one of the hinge members 16 and 17 are surrounded by, for instance embossed or stamped, grooves 20, 21 or projections 22, 23 which are identical with one another as to their dimensions and arrangement and which are coaxial with the internal gear annuli 18 or 19. In the exemplary embodiment which is illustrated in FIG. 2, the circular projection 22 of the hinge member 17 engages in the circular groove 21 of the hinge member 16, as a result of which the two hinge members 16 and 17 are mounted or supported on one another for relative tilting.

A support member 24 is accommodated in the space which is externally bounded by the internal gear annuli 18 or 19 of the hinge members 16 and 17, the support member 24 including a cross-sectionally elliptical disc 25. This cross-sectionally elliptical disc 25 is surrounded, at its peripheral surface, by an elastic band 26 which engages, at the regions 27 of the cross-sectionally elliptical disc 25 which surround the major axes of the elliptical generatrices of the peripheral surface, the internal gear annuli 18 and 19 of the hinge members 16 and 17.

In the illustrated exemplary embodiment of the present invention, the elastic band 26 consists of two elastic rings 28 which are arranged parallel to and with spacing from one another and which laterally partially overlap the hinge members 16 and 17. The rings 28 are connected with one another by cylindrical pins 29 which extend over the width of the two hinge members 16 and 17. The number of the cylindrical pins 29 which are arranged at the periphery of the cross-sectionally elliptical disc 25, corresponds to that of the internal gear annulus 19 which has the smaller number of teeth so that, in the illustrated and described example of the embodiment, the number of the cylindrical pins 29 is 60. These cylindrical pins 29, which are held at regular intervals between the rings 28, are pressed into the intermediate spaces between the teeth of the internal gear annuli 18 and 19 at the regions 27 of the cross-sectionally elliptical disc 25. When the cross-sectionally elliptical disc 25 rotates, the regions 27 of the cross-sectionally elliptical disc 25 revolve or orbit in the sense of rotation. Accordingly, the cylindrical pins 29 are being pressed into the internal gear annuli 18 or 19 at constantly changing engagement locations during the rotation of the cross-sectionally elliptical disc 25. However, the elastic band 25 does not share in the rotational movement but rather keeps its position with respect to the internal gear annulus 19 which has the same number of teeth as that of the cylindrical pins 29. However, inasmuch as the internal gear annulus 18 has a different number of teeth, there comes into existence a relative tilting movement between the hinge members 16 and 17 during the rotation of cross-sectionally elliptical disc 25; namely, the hinge member 16 is tilted or rotated with respect to the hinge member 17 by an angle corresponding to that between two teeth, in the course of one rotation of the cross-sectionally elliptical disc 25.

In order to be able to rotate the cross-sectionally elliptical disc 25, there is provided a stub shaft 30 which emerges at one side from the axial region of the disc 25. A handgrip member 12 which, in the illustrated embodiment, includes a handwheel 31, is connected, in a conventional manner, to the stub shaft 30 for joint rotation. The cross-sectionally elliptical disc 25 is provided, at its side which is opposite to that from which the stub shaft 30 projects, with a non-circular bore 32. The above-mentioned torque-transmitting shaft 15 has end portions which have compatible or conforming non-circular configurations and which are accommodated in the non-circular bores 32 so that the torque-transmitting shaft 15 is capable of transmitting torque and adjustment movement from the cross-sectionally elliptical disc 25 of the hinge 13 to the hinge 14 which is located at the opposite side of the seat. It will be appreciated that the cross-sectionally elliptical disc 25 of the hinge 14 need not and thus will not have the stub shaft 30 inasmuch as no additional handle 12 need be provided at the opposite side of the seat.

To maintain the axial position of the hinge members 16 and 17, as well as of the support member 24 and the elastic band 26, the cross-sectionally elliptical disc 25 is embraced at both of its sides by circularly shaped annular plates 33 which are provided at their outer circumference with a marginal portion 34 which surrounds the elastic band 26 and which is supported on the hinge members 16 and 17.

In the exemplary embodiment of the present invention which is illustrated in FIGS. 2 and 3, the annular plates 33 are affixed at the axial faces of the cross-sectionally elliptical disc 25 by means of two screws 35 which penetrate through the cross-sectionally elliptical disc 25. A sliding strip 36 is situated between the cylindrical pins 29 of the elastic band 26 and the periphery of the cross-sectionally elliptical disc 25. The sliding strip 36 is preferably made of hardened steel in order to reduce the wear and lower the frictional forces, while the rings 28 of the elastic band 26 are made of a suitable synthetic plastic material.

In a further exemplary embodiment of the present invention which is shown in FIGS. 4 to 6, the support member 24 is configurated as a cup-shaped disc 37 having a bottom wall 38 and an annular jacket wall 39 of a cross-sectionally elliptical outline which is formed on the bottom wall 38. This annular jacket wall 39 is again surrounded by the elastic band 26 and, once more, a sliding strip 36 is arranged between the cylindrical pins 29 of the elastic band 26 and the outer peripheral surface of the cross-sectionally elliptical annular jacket wall 39 of the disc 37.

The cross-sectionally elliptical annular jacket wall 39 of the cup-shaped disc 36 is provided, at a distance from the bottom wall 38 of the disc 37 which corresponds to the width of the elastic band 26, with an outwardly upset collar 40 which overlaps the elastic band 26 at one side thereof. While this collar 40 constitutes the one lateral abutment surface of the elastic band 26, the other lateral abutment surface for the elastic band 26 is formed by the bottom of a handwheel 41 which constitutes the handgrip member 12. At least two, mutually diametrically oppositely located, arresting members 42 project from the bottom of this handwheel 41 and engage in correspondingly spaced, opposite, openings 43 in the bottom wall 38 of the cup-shaped disc 37 and thus establish the connection between the handwheel 41 and the support member 24 which is constituted by the cup-shaped disc 37.

In the embodiment of the present invention which is illustrated in FIGS. 4 to 5, the one hinge member 16 includes two brackets 44 and 45 which bilaterally embrace the other hinge member 17 in the region of the cross-sectionally elliptical, cup-shaped disc 37. The brackets 44 and 45 are joined with one another at their edges and form connecting lugs 46. The connecting lugs 46 of the hinge member 16 are bored through in order to form holes 47, these holes 47 serving, in the same manner as holes 48 in the hinge member 17, for connecting the hinge members 17 16 with the seat component 10 or with the backrest component 11. Each of the brackets 44 and 45 which constitute the hinge member 16 is provided with the internal gear annulus 18 the number of teeth of which amounts, for instance, to 62. The hinge member 17 is provided with the further internal gear annulus 19, the meshing circle of which has the same diameter as the meshing circle of the gear annuli 16 provided in the lugs 44 and 45. In connection with the above-discussed elastic band, the same movement conditions as in the exemplary embodiment illustrated in FIGS. 2 and 3 also result in the exemplary embodiment shown in FIGS. 4 to 6. In order to prevent the lugs 44 and 45 which form the hinge member 16 from spreading apart, connecting bolts 49 are affixed to the hinge member 17 which have enlarged free end portions which overlap the lugs 44 or 45 at two locations. These bolts 49 can be formed as bipartite clinched bolts which are introduced in a bore in the hinge member 17 and projection welded therein.

In the modified embodiment of the present invention which appears in FIG. 6 and which corresponds, in substantive respects, to that illustrated in FIGS. 4 and 5, the collar 40 of the cup-shaped disc 37 has a circular outer periphery which is formed with an external gear annulus 50. A driving pinion 51 meshes with this external gear annulus 50, the driving pinion 51 being a component of a motor drive 52. Advantageously, the motor drive 52 includes an electromotor and a worm gear transmission, and the driving pinion 51 which meshes with the external gear annulus 50 of the cup-shaped disc 37 is mounted for joint rotation on the output shaft of the worm gear transmission. The motor drive 52 is affixed to a bracket 53 which is connected with the hinge member 17.

Instead of the handwheel 12, a cover plate 54 is attached to the bottom wall 38 of the cross-sectionally elliptical cup-shaped disc 37, the cover plate 54 also having two mutually opposite arresting members 42 which engage in the openings 43 in the bottom wall 38 of the cup-shaped disc 37. The rotation of the support member 24 which is constructed as the cup-shaped disc 37 occurs, in the exemplary embodiment illustrated in FIG. 6, as a result of the action of the motor drive 52 so that a manual rotation of the support member 24 is dispensed with, inasmuch as the motor drive 52 can be switched from one to the other sense of rotation.

It will be understood that each of the elements described above, or two or more together, may also find a useful application in other types of constructions differing from the types described above.

While the invention has been illustrated and described as embodied in an arrangement for adjusting the inclination of a backrest component of a motor vehicle, it is not intended to be limited to the details shown, since various modifications and structural changes may be made without departing in any way from the spirit of the present invention. So, for instance, it would be possible to use, instead of the elastic band which consists of the elastic rings 28 and the cylindrical pins 29 extending therebetween, such an elastic band which is provided with an external gear annulus which fittingly and meshingly engages the internal gear annuli 18 and 19 of the hinge members 16 17. Additionally, the shape of the interengaging gear parts is not to be limited to the illustrated embodiment. Similarly, the support member 24 could have a configuration different from those which have been revealed. What is important is that the support member 24 be provided with a, preferably cross-sectionally elliptical, support surface forming a gap with the internal gear annuli 18 and 19 in which the elastic band 26 is received and is pressed by the support surface into the spaces between the teeth of the gear annuli 18 and 19 of the hinge member 16 and 17. Finally, it will be appreciated that the exemplary mentioned numbers of the teeth of the gear annuli 18 and 19 are not mandatory and can always be selected in correspondence with the desired transmission ratio.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for adjusting the inclination of a backrest component relative to a seat component of a seat, particularly a vehicle seat, comprising, in combination, at least one hinge including two hinge members coaxially mounted on each other for tilting about an axis and each being stationarily connected to one of the components of the seat and having an internal gear annulus of a diameter at least substantially equal to and a number of teeth different from those of the other gear annulus; and means for relatively tilting the hinge members, including a support element arranged within said annuli for rotation about said axis and having at least one eccentric support surface facing the teeth of said internal gear annuli, and an elastic band disposed on said support surface, and including a plurality of uniformly distributed pins meshingly engaging a portion of said gear annuli, and the number of said pins corresponding to the number of teeth of the internal gear annulus which has the smaller number of teeth.

2. An arrangement as defined in claim 1, wherein said support surface has a cross-sectional configuration substantially corresponding to the region about the major axis of an ellipse.

3. An arrangement as defined in claim 2, wherein said support element has another support surface identical to said support surface and located diametrically opposite thereto.

4. An arrangement as defined in claim 3, wherein said numbers of the teeth of said internal gear annuli differ by at least a single multiple of two.

5. An arrangement as defined in claim 3, wherein said support element further has two connecting surfaces which extend between said support surfaces and complete the cross-sectional configuration of said periphery of said support element to an ellipse; and wherein said elastic band also contacts said connecting surfaces.

6. An arrangement as defined in claim 1; and further comprising means for rotating said support member about said axis, including a handgrip member.

7. An arrangement as defined in claim 6, wherein said rotating means further includes a stub shaft coaxially extending from said support member; and wherein said handgrip member is a handwheel mounted on said stub shaft for joint rotation.

8. An arrangement as defined in claim 1, wherein said hinge is located at one side of the seat; and wherein said support member has a central non-circular opening adapted to accommodate a compatibly configuration end portion of a connecting shaft connecting said hinge to another similar hinge located at the opposite side of the seat.

9. An arrangement as defined in claim 1, wherein said hinge members have respective circular projections, and circular grooves at least one of which receives one of the circular projections of the respective other hinge member.

10. An arrangement as defined in claim 1, wherein one of said hinge members consists, in the region of said support member, of two brackets which embrace the other of said hinge members from respective axial sides.

11. An arrangement for adjusting the inclination of a backrest component relative to a seat component of a seat, particularly a vehicle seat, comprising, in combination, at least one hinge including two hinge members mounted on each other for tilting about an axis and each being secured to an assigned component of the seat and having an internal gear annulus of a diameter at least substantially equal to and a number of teeth different from those of the other gear annulus; and means for relatively tilting the hinge members, including a support element arranged within said annuli for rotation about said axis and having at least one eccentric support surface facing the teeth of said internal gear annuli, and an elastic band disposed on said support surface, and including a plurality of uniformly distributed pins meshingly engaging a portion of said gear annuli, said elastic band being formed of two rings which partially laterally overlap said hinge members, and said pins which interconnect said rings are received in the spaces between the teeth of said internal gear annuli.

12. An arrangement as defined in claim 11, wherein the number of said pins is identical to the number of the teeth of that one of said internal gear annuli which has the smaller number of teeth.

13. An arrangement as defined in claim 11, wherein said elastic band further includes a sliding strip which immediately contacts said support surface and which supports said pins.

14. An arrangement for adjusting the inclination of a backrest component relative to a seat component of a seat, particularly a vehicle seat, comprising, in combination, at least one hinge including two hinge members mounted on each other for tilting about an axis and each being stationarily connected to one of the components of the seat and having an internal gear annulus of a diameter at least substantially equal to and a number of teeth different from those of the other gear annulus; and means for relatively tilting the hinge members, including a support element arranged within said annuli for rotation about said axis and having a least one eccentric support surface facing the teeth of said internal gear annuli, and an elastic band disposed on said support surface, and including a plurality of uniformly distributed pins meshingly engaging a portion of said gear annuli, said support member having a cup-shaped configuration and including a bottom and a peripheral jacket having said support surface.

15. An arrangement as defined in claim 14, wherein said bottom of said cup-shaped support member has at least two openings; and further comprising means for rotating said support member about said axis, including a handwheel having at least two arresting members which engage in said openings.

16. An arrangement as defined in claim 14, wherein said support member further includes a collar on said jacket remote from said bottom.

17. An arrangement as defined in claim 14, wherein said collar has a circular periphery and an external gear annulus thereon adapted to mesh with a pinion of a motor drive.

* * * * *